United States Patent
Mendenhall et al.

(10) Patent No.: US 6,372,191 B1
(45) Date of Patent: Apr. 16, 2002

(54) PHASE STABILIZED AMMONIUM NITRATE AND METHOD OF MAKING THE SAME

(75) Inventors: Ivan V. Mendenhall, Providence; Robert G. Smith, North Ogden; Robert D. Taylor, Hyrum, all of UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/454,958

(22) Filed: Dec. 3, 1999

(51) Int. Cl.[7] .................................................. C01C 1/18
(52) U.S. Cl. ....................................... 423/396; 423/275
(58) Field of Search .................................. 423/275, 396

(56) References Cited

U.S. PATENT DOCUMENTS

| | | |
|---|---|---|
| 2,220,891 A | 11/1940 | Cook et al. |
| 2,904,420 A | 9/1959 | Holker |
| 3,002,830 A | 10/1961 | Barr |
| 3,067,076 A | 12/1962 | Butcher et al. |
| 3,144,367 A | 8/1964 | Enoksson |
| 4,925,600 A | 5/1990 | Hommel et al. |
| 5,053,086 A | 10/1991 | Henry et al. |
| 5,063,036 A | 11/1991 | Engel et al. |
| 5,071,630 A | 12/1991 | Oberth |
| 5,125,684 A | 6/1992 | Cartwright |
| 5,139,588 A | 8/1992 | Poole |
| 5,271,778 A | 12/1993 | Bradford et al. |
| 5,292,387 A * | 3/1994 | Highsmith et al. ......... 423/396 |
| 5,460,668 A | 10/1995 | Lyon |
| 5,472,647 A | 12/1995 | Blau et al. |
| 5,516,377 A | 5/1996 | Highsmith et al. |
| 5,518,054 A | 5/1996 | Mitson et al. |
| 5,529,647 A | 6/1996 | Taylor et al. |
| 5,531,941 A | 7/1996 | Poole |
| 5,542,998 A | 8/1996 | Bucerius et al. |
| 5,542,999 A | 8/1996 | Bucerius et al. |
| 5,545,272 A | 8/1996 | Poole et al. |
| 5,589,661 A | 12/1996 | Menke et al. |
| 5,592,812 A | 1/1997 | Hinshaw et al. |
| 5,596,168 A | 1/1997 | Menke et al. |
| 5,608,183 A | 3/1997 | Barnes et al. |
| 5,641,938 A | 6/1997 | Holland et al. |
| 5,663,524 A | 9/1997 | Bucerius et al. |
| 5,677,510 A | 10/1997 | Bucerius et al. |
| 5,682,014 A | 10/1997 | Highsmith et al. |
| 5,725,699 A | 3/1998 | Hinshaw et al. |
| 5,726,382 A | 3/1998 | Scheffee et al. |
| 5,735,118 A | 4/1998 | Hinshaw et al. |
| 5,747,730 A | 5/1998 | Scheffee et al. |
| 5,780,768 A | 7/1998 | Knowlton et al. |
| 5,783,773 A | 7/1998 | Poole |
| 5,847,315 A | 12/1998 | Katzakian, Jr. et al. |
| 5,850,053 A | 12/1998 | Scheffee et al. |
| 5,866,842 A | 2/1999 | Wilson et al. |

FOREIGN PATENT DOCUMENTS

DE  44 42 169 C1  12/1995

* cited by examiner

Primary Examiner—Wayne C Angel
(74) Attorney, Agent, or Firm—Sally J. Brown; James D. Erickson

(57) ABSTRACT

A phase stabilized ammonium nitrate and a method of making the same wherein ammonium nitrate is stabilized through the presence of a stabilizing metal diammine dinitrate without requiring or necessitating the isolation of explosive metal tetrammine nitrate complexes.

19 Claims, 5 Drawing Sheets

PHASE STABILIZED AMMONIUM NITRATE AND METHOD OF MAKING THE SAME

CROSS REFERENCE TO RELATED APPLICATIONS

The subject matter of this application is related to prior U.S. patent applications Ser. No.09/124,944, filed on Jul. 30, 1998, now Mendenhall et al., U.S. Pat. No. 6,132,538, issued Oct. 17, 2000; Ser. No. 09/221,910, filed on Dec. 28, 1998, now Taylor et al., U.S. Pat. No. 6,103,030, issued Aug. 15, 2000; Ser. No.09/243,161, filed on Feb. 2, 1999, now Mendenhall et al., U.S. Pat. No. 6,077,372, issued Jun. 20, 2000; and Ser. No. 09/391,163, filed on Sep. 8, 1999, now Taylor et al., U.S. Pat. No. 6,083,331, issued Jul. 4, 2000. The disclosures of these related patent applications are each hereby incorporated by reference herein and made a part hereof, including but not limited to those portions which specifically appear hereinafter.

BACKGROUND OF THE INVENTION

This invention relates generally to ammonium nitrate. More particularly, this invention relates to phase stabilized ammonium nitrate and a method of making the same.

It is well known to protect a vehicle occupant using a cushion or bag, e.g., an "airbag cushion," that is inflated or expanded with gas when the vehicle encounters sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

While many types of inflator devices have been disclosed in the art for use in the inflating of one or more inflatable restraint system airbag cushions, inflator devices which rely on the combustion of a pyrotechnic, fuel and oxidizer combination or other form of gas generant to produce or at least in part form the inflation gas issuing forth therefrom have been commonly employed in conjunction with vehicular inflatable restraint airbag cushions.

Sodium azide has been a commonly accepted and used gas generating material. While the use of sodium azide and certain other azide-based gas generant materials meets current industry specifications, guidelines and standards, such use may involve or raise potential concerns such as involving handling, supply and disposal of such materials.

The development of safe gas generant material alternatives to sodium azide for commercial application in inflatable restraint systems commonly involves the oftentimes conflicting goals or objectives of increasing the gas output of the gas generant material while reducing or minimizing the costs associated with the gas generant material, including the costs associated with ingredients and the processing thereof.

The incorporation and use of ammonium nitrate as an oxidizer in such gas generant formulations has been found to be one generally cost-effective approach for exceeding the current state of the art gas generant formulation gas yield of about 3 moles of gas per 100 grams of gas generant formulation. In particular, ammonium nitrate is relatively inexpensive and, when burned with guanidine nitrate fuel, generally combusts to all gaseous species resulting in gas yields approaching 4 moles of gas per 100 grams of material.

Unfortunately, the general incorporation and use of ammonium nitrate in pyrotechnic gas generant formulations has generally been subject to certain difficulties. For example, ammonium nitrate-containing pyrotechnic gas generant formulations have commonly been subject to one or more of the following shortcomings: low bum rates, burn rates exhibiting a high sensitivity to pressure, as well as to phase or other changes in crystalline structure such as may be associated with volumetric expansion such as may occur during temperature cycling over the normally expected or anticipated range of storage conditions, e.g., temperatures of about −40° C. to about 110° C. Such changes of form or structure may result in physical degradation of such gas generant formulation forms such as when such gas generant formulation has been shaped or formed into tablets, wafers or other selected shape or form. Further, such changes, even when relatively minute, can strongly influence the physical properties of a corresponding gas generant material and, in turn, strongly affect the burn rate of the generant material. Unless checked, such changes in ammonium nitrate structure may result in such performance variations in the gas generant materials incorporating such ammonium nitrate as to render such gas generant materials unacceptable for typical inflatable restraint system applications.

In view thereof, efforts have been directed to minimizing or eliminating such volume expansion during normal temperature cycling and the effects thereof. It has been found that the incorporation of a transition metal diammine dinitrate such as copper diammine dinitrate, nickel diammine dinitrate or zinc diammine dinitrate, for example, in ammonium nitrate, can serve to phase stabilize the mixture and minimize or eliminate volumetric expansion during normal temperature cycling. Further, ammonium nitrate stabilized with such transition metal diammine dinitrates are typically advantageously less hygroscopic than ammonium nitrate phase stabilized by other methods and the use of such transition metal dianunine dinitrates has also been found to result in combustion products which form a more easily filterable clinker.

A traditional method for the incorporation of a quantity of such metal diammine dinitrate into ammonium nitrate is outlined in U.S. Pat. No. 5,063,036. In general accordance therewith, a metal oxide (such as cupric oxide) is reacted with ammonium nitrate according to the following chemical reaction:

$$CuO+2NH_4NO_3 \rightarrow Cu(NH_3)_2(NO_3)_2+H_2O \tag{1}$$

Such reaction occurs at elevated temperatures (e.g., temperatures in excess of 140° C.) either in a solid state or in an ammonium nitrate melt. The rate of such solid state reaction is generally dependent on the processing temperature. However, even under normal processing conditions such a reaction process would normally take several hours to complete. Moreover, temperatures high enough to complete the reaction in a reasonable amount of time are typically high enough to cause safety concerns over self-decomposition of the ammonium nitrate and such as may possibly be accompanied by explosion. Performance of the reaction in an ammonium nitrate melt generally increases the reaction rate but such processing generally requires specialized equipment and techniques in order to efficiently convert the molten mixture into desirably easy to handle solid free-flowing granules. Further, processing temperatures required to melt such ammonium nitrate/metal oxide mixtures are also generally great enough to pose safety concerns.

An alternative reaction process proposed by Hommel et al. in U.S. Pat. No. 4,925,600 is to combine a metal nitrate with ammonia in aqueous solution to form the corresponding metal tetrammine nitrate (e.g., $Cu(NH_3)_4(NO_3)_2$). The metal tetrammine nitrate complex is then in turn isolated, dried, and mixed with solid ammonium nitrate and metal nitrate. This mixture can then be melted, atomized, and cooled to a granular form. In the melt, the following reaction occurs:

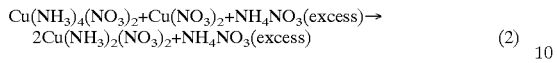
$$Cu(NH_3)_4(NO_3)_2 + Cu(NO_3)_2 + NH_4NO_3(\text{excess}) \rightarrow$$
$$2Cu(NH_3)_2(NO_3)_2 + NH_4NO_3(\text{excess}) \qquad (2)$$

The mixture of ammonium nitrate and metal tetrammine nitrate complex advantageously forms a eutectic mixture that melts at a lower temperature than a corresponding mixture of ammonium nitrate and the metal oxide. While such lower melting point increases the thermal safety margin associated with the reaction, such processing generally requires an extra reaction or processing step to prepare and isolate the metal tetrammine nitrate complex. Further, the handling and use of these complexes may also raise various safety concerns. As a result, such large scale production is generally not practical. Further, since the final reaction is performed in a melt, specialized equipment and techniques to efficiently convert the molten mixture into solid free-flowing granules is typically required.

Thus, there is a need and a demand for a method of making ammonium nitrate phase stabilized via the presence of a selected metal diammine dinitrate and which method avoids undesirably high processing temperatures, i.e., processing temperatures which are undesirably near the decomposition temperature of ammonium nitrate, and which avoids isolation of metal tetrammine nitrate complexes such as may raise shipping and handling concerns.

SUMMARY OF THE INVENTION

A general object of the invention is to provide an improved method of making phase stabilized ammonium nitrate as well as an improved resulting phase stabilized ammonium nitrate.

The general object of the invention can be attained, at least in part, through a method which includes drying and heat treating an aqueous slurry containing ammonium nitrate and a combination of at least one transition metal nitrate and an ammonia source to form a phase stabilized ammonium nitrate. In the slurry, the ammonia source is present in at least a stoichiometric amount relative to the at least one transition metal nitrate for formation of a corresponding transition metal diammine dinitrate.

The prior art generally fails to provide a method of making phase stabilized ammonium nitrate, particularly ammonium nitrate phase stabilized via the inclusion of a suitable phase stabilizing amount or proportion of a desired metal diammine dinitrate. Further, the prior art generally fails to provide a correspondingly phase stabilized ammonium nitrate such as retains properties or characteristics, such as relating to crush strength and density, to as great an extent as may be desired when subjected to temperature cycling such as can be expected in various intended applications.

The invention, in accordance with an alternative preferred embodiment of the invention, further comprehends a method of making phase stabilized ammonium nitrate, which method includes:

combining, in an aqueous slurry, at least a nitrate of at least one transition metal selected from the group of copper, zinc, nickel and combinations thereof and an ammonia source, in at least a stoichiometric amount relative to the transition metal nitrate for formation of a corresponding transition metal diammine dinitrate, to form a first precursor;

forming a second precursor to the phase stabilized ammonium nitrate, the second precursor being in the form of a slurry containing the first precursor and ammonium nitrate, drying the second precursor to form a third precursor to the phase stabilized ammonium nitrate, the third precursor having the form of a powder, and heat treating the third precursor to form a phase stabilized ammonium nitrate comprising ammonium nitrate containing at least about 1 wt. % of a diammine dinitrate of the at least one transition metal.

The invention, in accordance with another alternative preferred embodiment of the invention, still further comprehends a phase stabilized ammonium nitrate. In particular, such phase stabilized ammonium nitrate is desirably made by drying and heat treating an aqueous slurry containing ammonium nitrate and a combination of at least one transition metal nitrate and at least one ammonia source, present in at least a stoichiometric amount relative to the at least one transition metal nitrate for formation of a corresponding transition metal diammine dinitrate.

Other objects and advantages will be apparent to those skilled in the art from the following detailed description taken in conjunction with the appended claims and drawings.

DETAILED DESCRIPTION OF THE INVENTION

Figure 1:
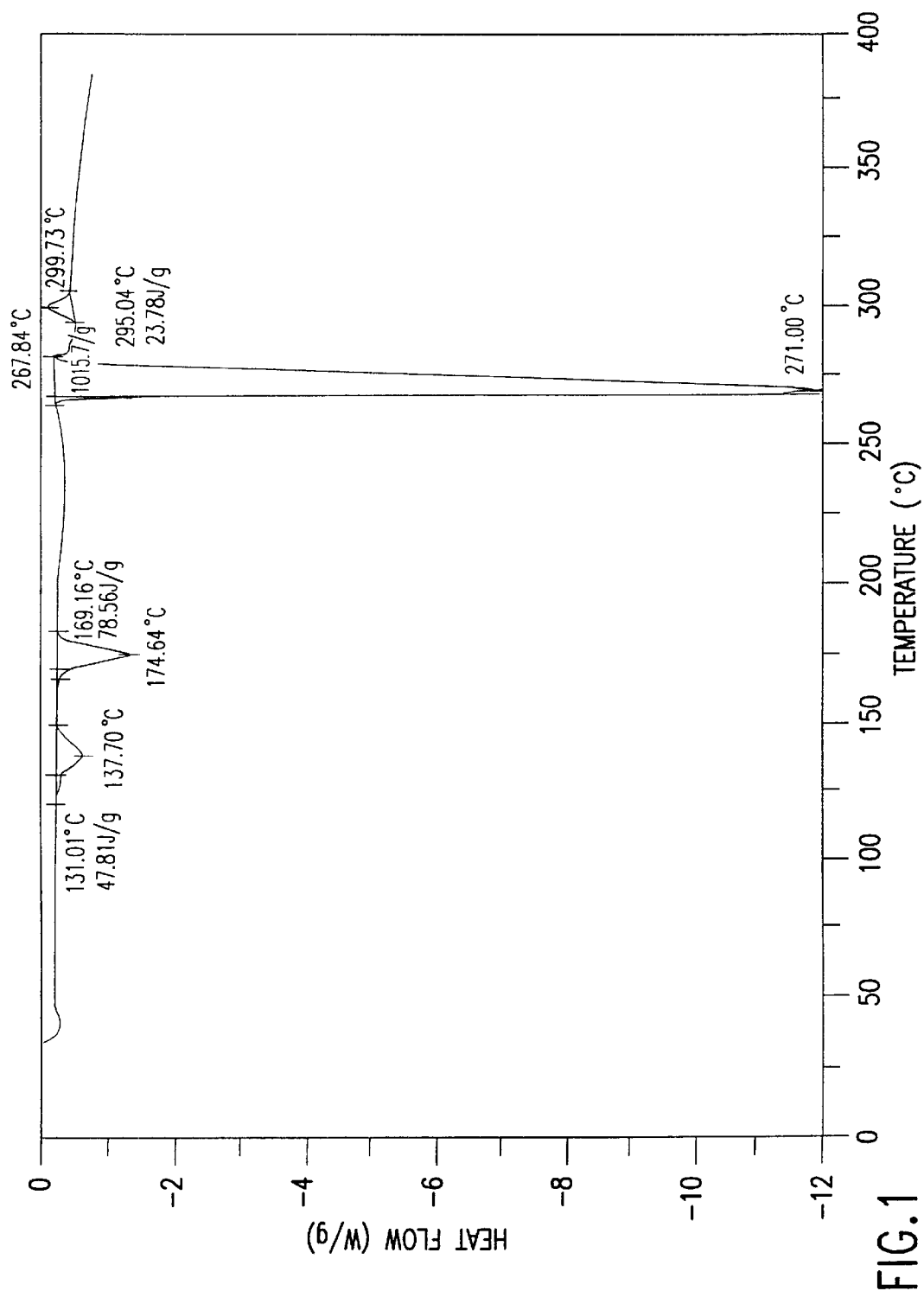
FIGS. 1–3 are the thermograms obtained by thermal analysis (i.e., Differential Scanning Calorimetry (DSC)) of the materials of EXAMPLE 1 AND COMPARATIVE EXAMPLES 1 and 2, respectively.

The present invention provides an improved method of making phase stabilized ammonium nitrate as well as an improved resulting phase stabilized ammonium nitrate. In particular, the invention provides an improved method of making a phase stabilized ammonium nitrate such as may desirably be used in gas generant formulations such as used in the inflation of inflatable devices such as vehicle occupant restraint airbag cushions.

In accordance with the invention, a metal nitrate, particularly a transition metal nitrate, is combined with a stoichiometric amount or more of an ammonia source for the formation of a corresponding transition metal diammine dinitrate to form a first precursor.

As described in greater detail below, preferred nitrates for use in the practice of the invention include nitrates of at least one transition metal selected from the group of copper, zinc, nickel and combinations thereof. Nitrates of the transition metal copper are generally preferred for use in the practice of the invention. In particular, such nitrates may advantageously provide or result in increased or otherwise improved burn rates while desirably minimizing or reducing possible complications such as relating to handling and safety.

Suitable ammonia sources for use in the practice of the invention include: ammonium bicarbonate, ammonium carbonate, ammonium carbamate, ammonium hydroxide, or anhydrous ammonia such as each in the form of an aqueous slurry. In particular, the metal nitrate can desirably be reacted with a stoichiometric amount or more of ammonia from one or more of the following sources: ammonium bicarbonate, ammonium carbonate, ammonium carbamate, ammonium hydroxide, anhydrous ammonia or mixtures thereof, to form the corresponding metal diammine dinitrate such as in accordance with the following reactions relative to the formation of copper diammine dinitrate:

a) via ammonium bicarbonate, $$Cu(NO_3)_2 \cdot 2.5H_2O + 2NH_4HCO_3 \rightarrow Cu(NH_3)_2(NO_3)_2 + 2CO_2 + 4.5H_2O \quad (3)$$

b) via ammonium carbonate, $$Cu(NO_3)_2 \cdot 2.5H_2O + (NH_4)_2CO_3 \rightarrow Cu(NH_3)_2(NO_3)_2 + CO_2 + 3.5H_2O \quad (4)$$

c) via ammonium carbamate, $$Cu(NO_3)_2 \cdot 2.5H_2O + NH_2CO_2NH_4 \rightarrow Cu(NH_3)_2(NO_3)_2 + CO_2 + 2.5H_2O \quad (5)$$

d) via ammonium hydroxide, $$Cu(NO_3)_2 \cdot 2.5H_2O + 2NH_4OH \rightarrow Cu(NH_3)_2(NO_3)_2 + 4.5H_2O \quad (6)$$

e) via anhydrous ammonia, $$Cu(NO_3)_2 \cdot 2.5H_2O + 2NH_3 \rightarrow Cu(NH_3)_2(NO_3)_2 + 2.5H_2O \quad (7)$$

Thus, in accordance with a preferred practice of the invention, such reaction mixtures desirably provide or result in at least two moles of ammonia per mole of metal provided by the metal nitrate. Further, while the reactions (3)–(7) have been shown above employing cupric nitrate in the 2.5-hydrate form, the broader practice of the invention is not necessarily limited by the particular hydrate form of the ingredients. For example, similar reactions can be shown employing cupric nitrate trihydrate.

In accordance with one preferred embodiment of the invention, a second precursor to the phase stabilized ammonium nitrate is formed to contain the first precursor and ammonium nitrate. As further detailed below, such second precursor desirably is in the form of a slurry, e.g., an aqueous slurry. As will be appreciated by those skilled in the art and guided by the teachings herein provided, such precursor can be arrived at by various techniques or specific processing steps without deviating from the general principles and guidelines herein provided. For example, in accordance with one embodiment of the invention, the ammonium nitrate in the "second precursor" or a desired portion thereof may be added to the first precursor material, prepared as described above. In accordance with an alternative preferred embodiment of the invention, the ammonium nitrate or a desired portion thereof may simply be added to or included in the aqueous slurry from which the first precursor, as described above, is formed or produced. In particular, the presence of ammonium nitrate in such slurry mix is believed to advantageously serve to stabilize such metal diammine dinitrate or various related forms such as may be formed therein from subsequent, undesired reactions, for example, from subsequent hydrolysis reaction.

This precursor slurry is, in turn, dried and heated to form a phase stabilized ammonium nitrate. In particular, such phase stabilized ammonium nitrate desirably contains a phase stabilizing quantity or relative proportion of the diammine dinitrate of the transition metal of the nitrate used above. In practice, the relative proportion of such transition metal diammine dinitrate required to be present in ammonium nitrate to effect desired phase stabilization will typically vary dependent on the particular application and conditions of operation. In general, however, such phase stabilizing quantity or proportion of transition metal diammine dinitrate typically constitutes the transition metal diammine dinitrate being present in the ammonium nitrate in a relative amount of at least about 1 wt. %, preferably at least about 10 wt. % and, most preferably, at least about 15 wt. %. For example, in typical vehicle occupant inflatable restraint system applications, the inclusion of at least about 15 wt. % of such transition metal diammine dinitrate in ammonium nitrate is generally desired to achieve a desired level of ammonium nitrate phase stabilization such as may avoid unacceptable performance variations in corresponding gas generant materials as such as would otherwise render such gas generant materials unacceptable for typical inflatable restraint system applications.

In particular, such drying treatment can be variously accomplished, as those skilled in the art and guided by the teachings herein provided will appreciate. For example, tray drying such as involving the use of a vacuum or convection oven, for example, can be used. In a preferred embodiment of the invention, such precursor slurry is desirably spray dried such as to form a precursor to the phase stabilized ammonium nitrate and which precursor desirably has the form of a powder. As will be appreciated, spray drying may advantageously provide or result in high processing throughputs while avoiding subjecting the treated materials to elevated temperatures for prolonged periods of time.

Following such spray drying and as detailed below in the EXAMPLES, a relatively minor or mild heat treatment (i.e., heating of the material to a temperature of no more than about 135° C., e.g., a temperature of approximately 125–130° C. and holding the heated material at that temperature for a duration of at least approximately 5 minutes) of the material resulting upon such spray drying, may be desired or required in order to ensure or complete conversion of the transition metal species to the desired transition metal diammine dinitrate and such has been found to remain in a stable form. As will be appreciated, such subsequent heat treatment can desirably be accomplished in a solid state, thus desirably simplifying processing and handling, for example.

In accordance with one preferred embodiment of the invention, such drying and heating can desirably be conducted or accomplished in a single processing step such as where sufficient heat treating of the processed material, as described in greater detail below, is accomplished during the drying process. In an alternative preferred embodiment of the invention, such drying and heating are conducted or accomplished in separate processing steps, such as may be conducted in sequence. In accordance with one such alternative embodiment, such relatively minor or mild heat treatment can be relatively easily implemented into a processing scheme such as via in-line fluid bed dryers such as may be incorporated between a spray dry tower and an associated collection bin, for example. In either case, such heat treatment is generally either or both at significantly lower processing temperatures or for significantly shorter durations than associated with prior art processing techniques.

The application of more severe heat treatment processing (i.e., processing involving either or both heating the material to a higher temperature, such as a temperature in excess of or greater than 135° C., or for significantly longer periods of time, such as for durations of 10 minutes or more) is generally not preferred or desired. In particular, such more severe heat treatment processing generally has associated therewith correspondingly higher processing costs without necessarily providing or resulting in concomitant processing or product benefits or improvements.

Those skilled in the art and guided by the teachings herein provided will appreciate that post-spray dry heating can desirably be avoided where, for example, sufficient heat treatment is achieved or realized during the drying process. Alternatively, however, such heating can be relatively easily implemented into a processing scheme such as via in-line fluid bed dryers such as may be incorporated between a spray dry tower and an associated collection bin, as described above.

In accordance with a preferred practice of the invention, the resulting phase stabilized ammonium nitrate powder desirably contains a phase stabilizing quantity or proportion of the diammine dinitrate of the associated transition metal, as detailed above.

As will be appreciated, such phase stabilized ammonium nitrate can find various applications. For example, such phase stabilized ammonium nitrate can find application in various gas generant formulations such as used in association with inflatable restraint systems and such as otherwise known in the art. In particular, such phase stabilized ammonium nitrate can be easily implemented into various gas generant formulations such as those prepared or produced via extrusion or granulation, for example.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Example 1

A 100-gram sample of phase stabilized ammonium nitrate (stabilized with 15 wt. % copper diammine dinitrate) was prepared in accordance with the invention by reacting 15.74 grams of cupric nitrate 2.5 hydrate with 10.7 grams of ammonium bicarbonate. This reaction mixture was allowed to react at approximately 40° C. until all of the carbon dioxide gas had evolved. Into this reaction mixture, were then stirred 85 grams of ammonium nitrate and 10 grams of water. The resulting mixture was in the form of a thick slurry having a water content of 13.41 wt. %. The slurry was dried in a vacuum oven at 80° C. and then granulated to form a precursor powder. The precursor powder was heated raising the temperature of the powder to the range of 125 to 130° C. and complete formation of the copper diammine dinitrate.

Then 1-gram portions of the sample were pressed into a 0.5-inch diameter cylinder at 12,000-lbs. force to form correspondingly shaped pellets. The density and baseline axial crush strength of five sample pellets were measured. The average density and crush strength for the five sample pellets is reported in TABLE 1, below.

Comparative Example 1

Similarly, 1-gram portions of a control sample of pure ammonium nitrate were pressed into a 0.5-inch diameter cylinder at 12,000-lbs. force to form correspondingly shaped pellets. The density and baseline axial crush strength of five sample pellets were measured. The average density and crush strength for the five sample pellets is also reported in TABLE 1, below.

Comparative Example 2

A 100-gram sample of phase stabilized ammonium nitrate was prepared via the traditional method of adding cupric oxide (the required amount for formation of 15% copper diammine dinitrate) to a melt of ammonium nitrate and allowing the cupric oxide and ammonium nitrate to react for several minutes at melt temperature (approximately 160° C.) while being stirred. The molten mixture was then removed from the heat source and cooled while being stirred to form a dry granular product.

Then 1-gram portions of this dry granular product sample were pressed into a 0.5-inch diameter cylinder at 12,000-lbs. force to form correspondingly shaped pellets. The density and baseline axial crush strength of five sample pellets were measured. The average density and crush strength for the five sample pellets is also reported in TABLE 1, below.

ANALYSIS

Figure 2:
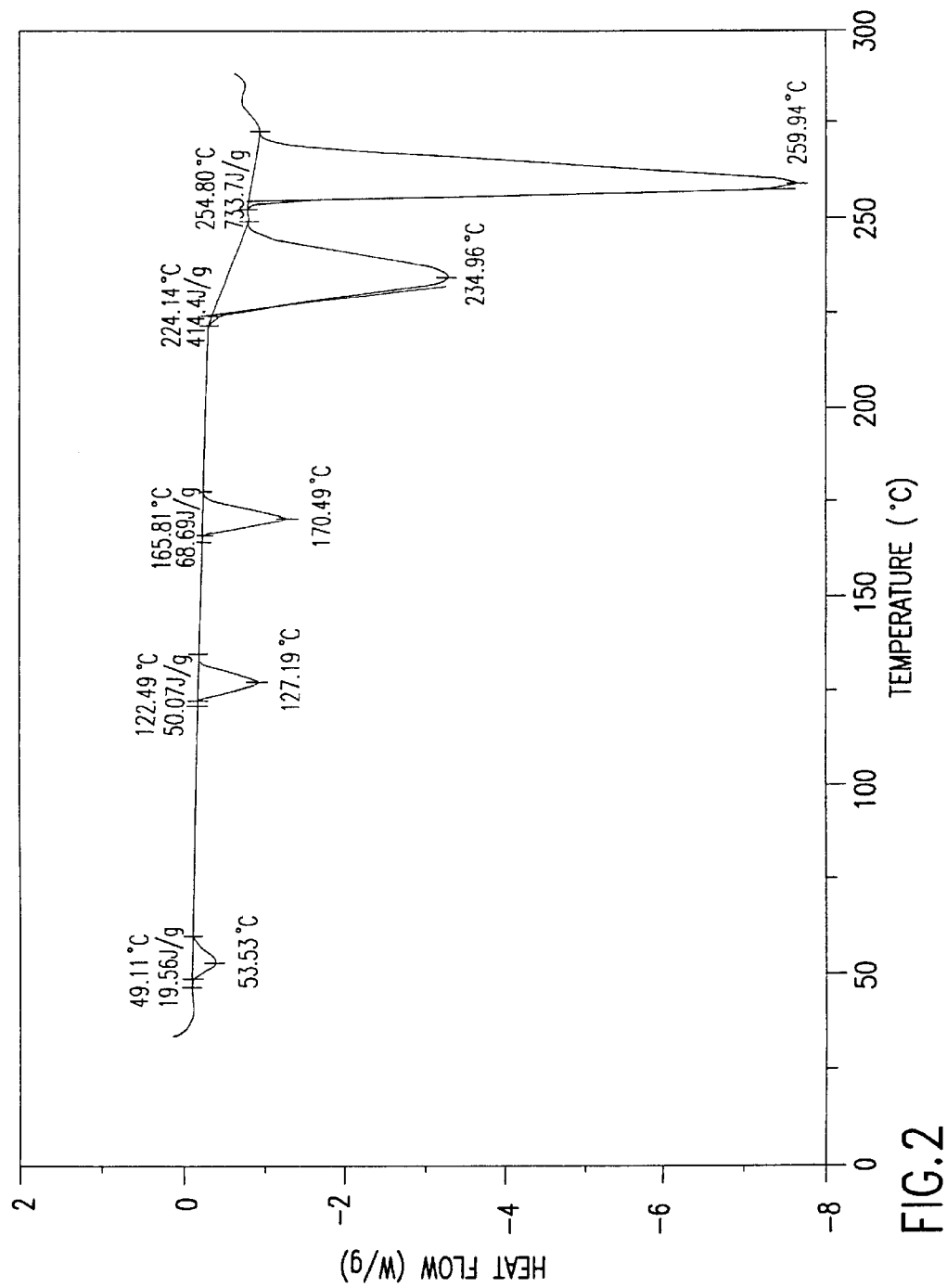
Figure 3:
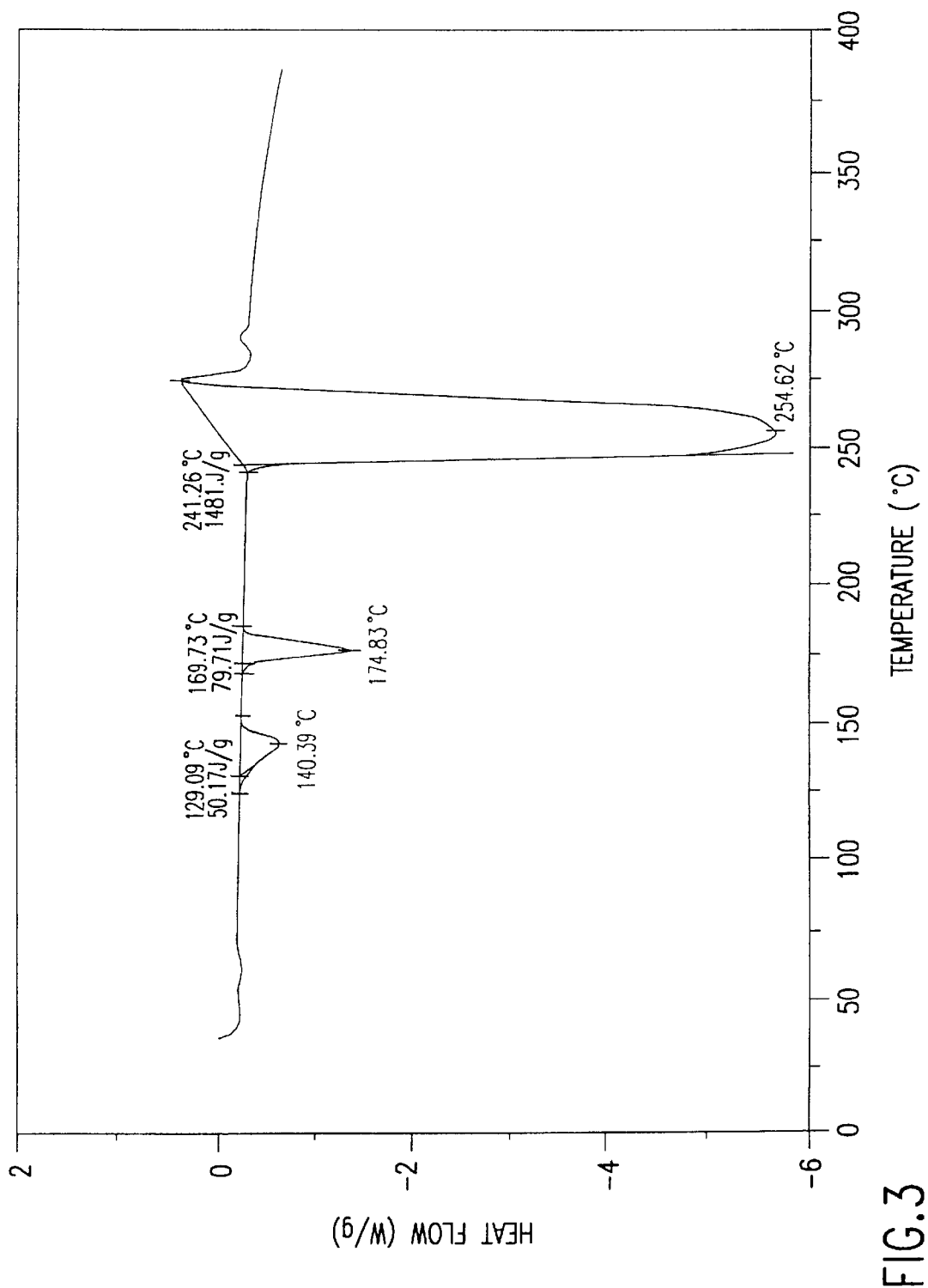

The pure ammonium nitrate of COMPARATIVE EXAMPLE 1 and the dried, phase stabilized ammonium nitrate powders of EXAMPLE 1 and COMPARATIVE EXAMPLE 2 were analyzed by differential scanning calorimetry. FIGS. 1–3 are the thermograms of the materials of EXAMPLE 1 AND COMPARATIVE EXAMPLES 1 and 2, respectively.

Figure 4:
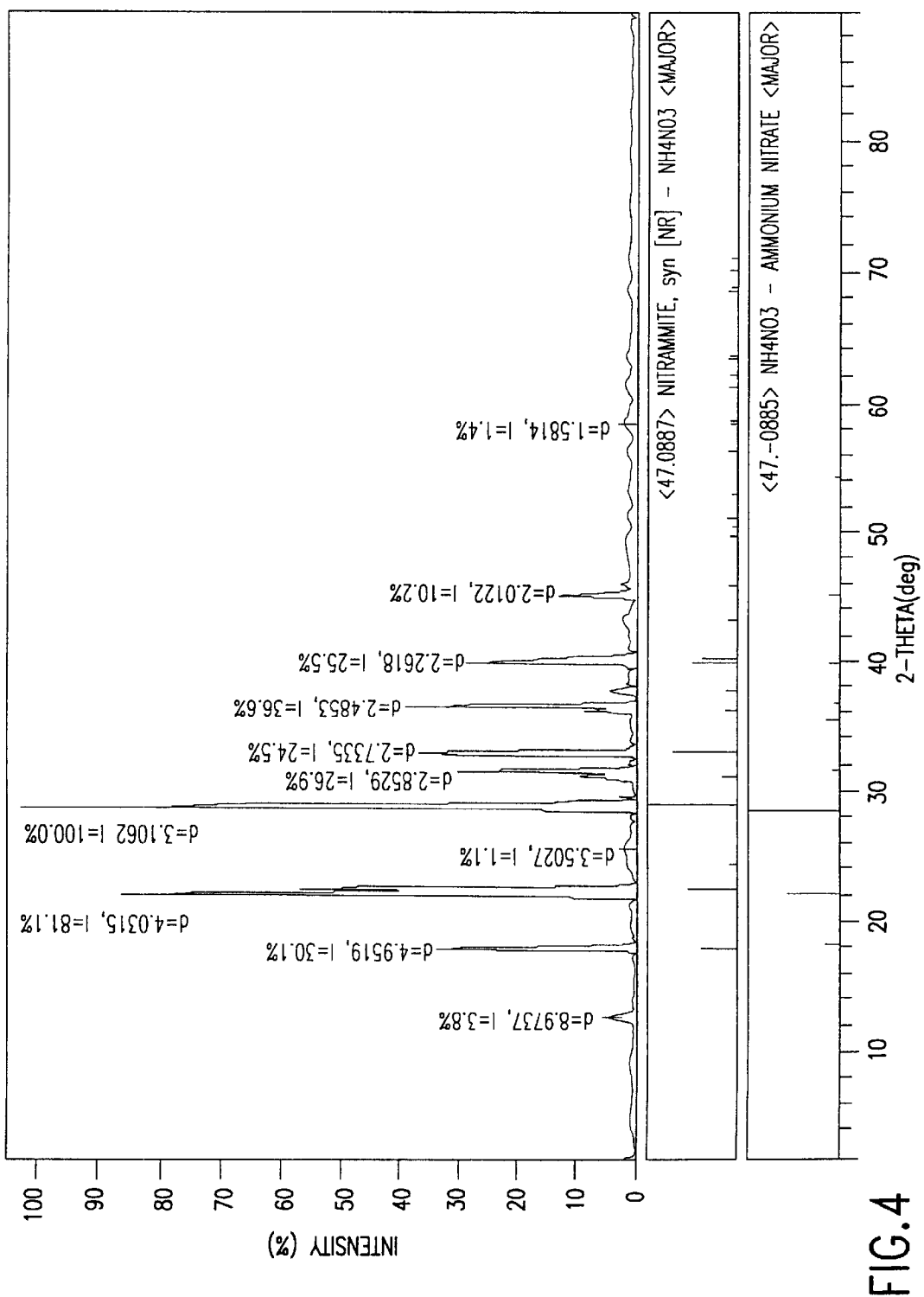
FIGS. 4 and 5 are the x-ray diffraction patterns obtained for the dried phase stabilized ammonium nitrate powders of EXAMPLE 1 and COMPARATIVE EXAMPLE 2, respectively.
Figure 5:
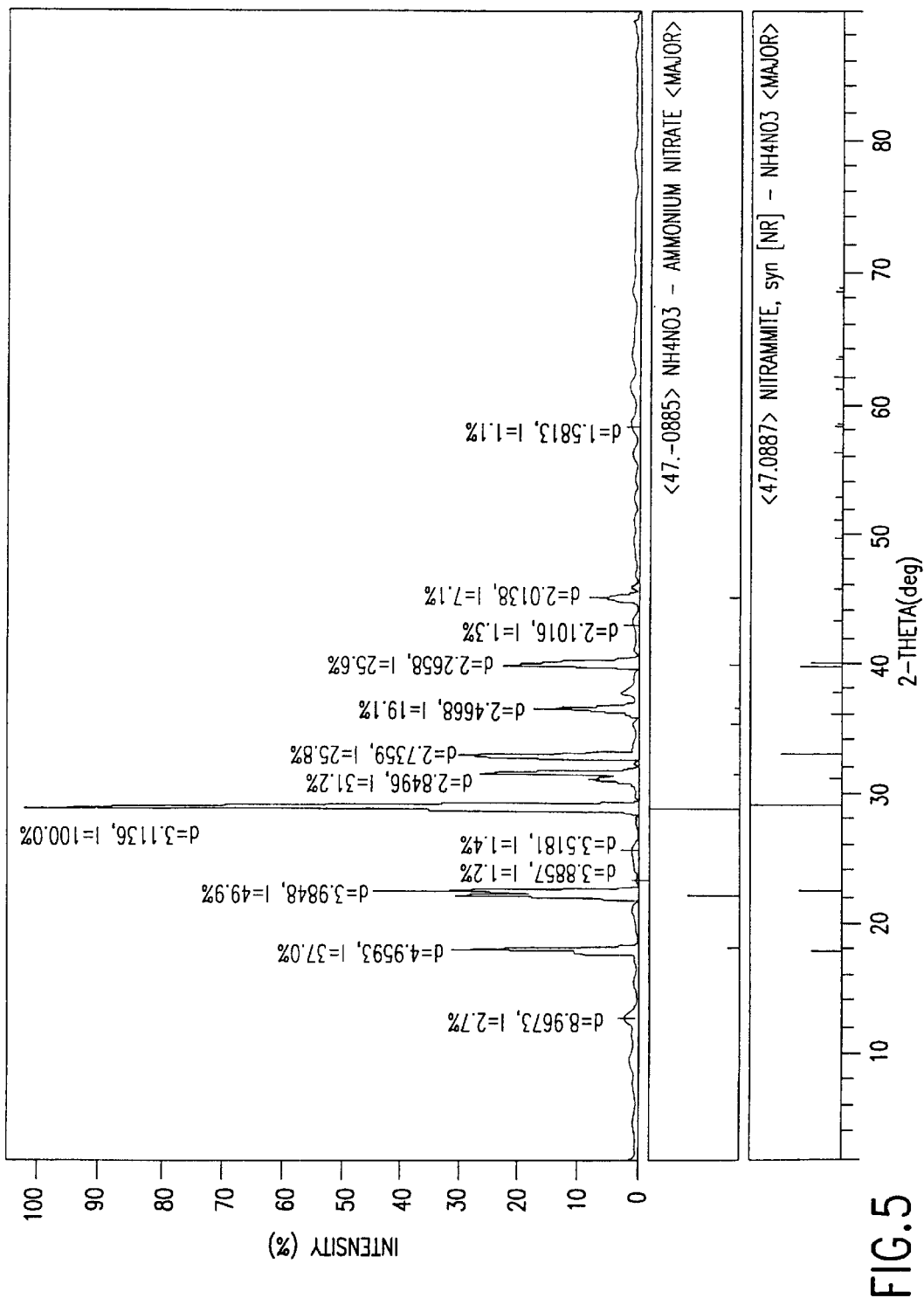

The dried phase stabilized ammonium nitrate powders of EXAMPLE 1 and COMPARATIVE EXAMPLE 2 were also analyzed by x-ray diffraction. FIGS. 4 and 5 show the x-ray diffraction patterns for phase stabilized ammonium nitrate prepared by the proposed process (EXAMPLE 1) and phase stabilized ammonium nitrate prepared by the traditional process (COMPARATIVE EXAMPLE 2), respectively.

DISCUSSION OF RESULTS

The endotherm (negative peak) at approximately 50° C., shown in FIG. 2, is believed to be associated with the presence of the phase (sometimes referred to a "phase IV") in ammonium nitrate that is believed responsible for volume expansion during temperature cycling. As shown in FIGS. 1 and 3, this endotherm is absent in the phase stabilized samples.

As shown by FIGS. 4 and 5, the x-ray diffraction patterns for phase stabilized ammonium nitrate prepared by the process of the invention and the traditional process, respectively, were substantially the same.

Example 2

Five of the 1-gram portion pellets prepared in EXAMPLE 1 were then sealed in a heat age bottle. The loaded heat age bottle was then subjected to 200 temperature cycles of −40° C. to 107° C. (i.e., where a cycle constitutes 40 minutes in a chamber wherein the temperature was maintained at −40° C. and 40 minutes in a chamber wherein the temperature was maintained at 107° C.).

After the temperature cycling, visual observations were recorded, as noted below. The density and crush strength of each of the five heat-treated sample pellets were then measured. The average density and crush strength for the five heat-treated sample pellets are also reported in TABLE 1, below.

Comparative Examples 3 and 4

Similarly, five of the 1-gram portion pellets prepared in COMPARATIVE EXAMPLES 1 and 2 were sealed in respective heat age bottles. The loaded heat age bottles were then subjected to 200 temperature cycles of −40° C. to 107° C., similar to that described above with reference to EXAMPLE 2.

After the temperature cycling, visual observations were recorded. The crush strength and density of individual pellets of each of the five heat-treated sample pellets of COMPARATIVE EXAMPLES 1 and 2, respectively, were then measured, as also identified in TABLE 1, below.

RESULTS AND DISCUSSION

Visual Observation Notes

1. The pellets of the sample material of EXAMPLE 1 (i.e., the pellets of phase stabilized ammonium nitrate prepared in accordance with the invention) exhibited no defects or color change after the temperature cycling protocol.
2. The pellets of the sample material of COMPARATIVE EXAMPLE 1 (i.e., CE 1, the pure ammonium nitrate pellets) broke up during temperature cycling and ended up as a pile of powder.
3. The pellets of the sample material of COMPARATIVE EXAMPLE 3 (i.e., CE 3, the pellets of phase stabilized ammonium nitrate prepared by the traditional process) though generally remaining intact after the temperature cycling protocol, exhibited a white film on the surface and also exhibited both surface cracking and blistering.

TABLE 1

| SAMPLE | Before temp cycling | | After temp cycling | |
|---|---|---|---|---|
| | Density (g/cc) | Crush (lbs.) | Density (g/cc) | Crush (lbs.) |
| EXAMPLE 1 | 1.75 | 142 | 1.53 | 35 |
| CE 2 | 1.75 | 28 | N/A | N/A |
| CE 3 | 1.75 | 100 | 1.31 | 5 |

As the data in TABLE 1 shows, EXAMPLE 1 (the pellets of phase stabilized ammonium nitrate prepared in accordance with the invention) exhibited improved crush strength retention and reduced density loss, as compared to pure ammonium nitrate (CE 2) and traditionally phase stabilized ammonium nitrate (CE 3). Thus, the process of the invention results in a phase stabilized ammonium nitrate which exhibited improved crush strength and superior retention of visual appearance, mechanical properties and crush strength upon temperature cycling, as compared to traditionally phase stabilized ammonium nitrate.

Examples 3–5

In each of these Examples, a 100-gram sample of phase stabilized ammonium nitrate (stabilized with 15 wt. % copper diammine dinitrate), similar to that of EXAMPLE 1, was prepared in a manner similar to EXAMPLE 1 but now employing the alternative ammonia sources of ammonium carbonate, ammonium carbamate, and ammonium hydroxide (28 wt. %), respectively, in place of ammonium bicarbonate, in accordance with TABLE 2, below.

In particular, in EXAMPLES 3 and 4, the phase stabilized ammonium nitrate was prepared in a manner similar to EXAMPLE 1, described above, except now employing ammonium carbonate and ammonium carbamate, respectively. In EXAMPLE 5, ammonium hydroxide was added to cupric nitrate to form an aqueous slurry with no evolution of carbon dioxide. In each of these examples, the amount of water added was the amount required to provide a 13.41 wt. % final water content in the respective slurry.

Then, similar to EXAMPLE 1, described above, the aqueous slurry of each of these Examples was vacuum dried at a temperature of 80° C. until dry. The dried slurry of each of these Examples was then further heated at approximately 130° C. for a time period (of approximately 5 minutes), sufficient that the mixture of copper complexes were converted to a stable complex of copper diammine dinitrate.

Example 6

In this Example, a phase stabilized ammonium nitrate (stabilized with 15 wt. % copper diammine dinitrate), similar to that of EXAMPLE 1 is prepared but now using the alternative ammonia source of anhydrous ammonia, in place of ammonium bicarbonate, in accordance with TABLE 2, below. In particular, ammonia gas is added to cupric nitrate to form an aqueous slurry with no evolution of carbon dioxide. Water is added in an amount required to provide a 13.41 wt. % final water content in the slurry, as in the above-described Examples.

Then, similar to EXAMPLES 1, 3 and 4, described above, the aqueous slurry is vacuum dried at a temperature of 80° C. until dry. The dried slurry is then further heated at approximately 130° C. for a time period (of approximately 5 minutes), sufficient that the mixture of copper complexes is converted to a stable complex of copper diammine dinitrate.

TABLE 2

| EXAMPLE | Ammonia source | amount (g) | $H_2O$ (g) |
|---|---|---|---|
| 3 | $(NH_4)_2CO_3$ | 6.50 | 11.2 |
| 4 | $NH_2CO_2NH_4$ | 5.28 | 11.2 |
| 5 | $NH_4OH$ (28 wt. %) | 8.22 | 6.5 |
| 6 | $NH_3$ | 2.30 | 12.4 |

The proposed method allows for preparation of metal diammine dinitrate phase stabilized ammonium nitrate without isolation of explosive metal tetrammine nitrate complexes. The final relatively mild heat treatment, such as may be desired to ensure complete formation of metal diammine dinitrate, can desirably be done or preformed in a solid state, not in a melt. Thus, facilitating and permitting the preparation of phase stabilized ammonium nitrate, in accordance with the invention, via the use or processing of existing spray dry/fluid bed dryer equipment.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of making a phase stabilized ammonium nitrate, the method comprising:

drying and heat treating an aqueous slurry containing ammonium nitrate and a combination of at least one transition metal nitrate and an ammonia source, the ammonia source being present in at least a stoichiometric amount relative to the at least one transition metal nitrate for formation of a corresponding transition metal diammine dinitrate, to form a phase stabilized ammonium nitrate.

2. The method of claim 1 wherein the phase stabilized ammonium nitrate contains at least about 1 wt. % of a diammine dinitrate of the at least one transition metal.

3. The method of claim 2 wherein the phase stabilized ammonium nitrate contains at least about 10 wt. % of a diammine dinitrate of the at least one transition metal.

4. The method of claim 3 wherein the phase stabilized ammonium nitrate contains at least about 15 wt. % of a diammine dinitrate of the at least one transition metal.

5. The method of claim 1 wherein the at least one transition metal nitrate is a nitrate of a transition metal selected from the group consisting of copper, nickel, zinc and combinations thereof.

6. The method of claim 1 wherein the at least one transition metal nitrate comprises a nitrate of copper.

7. The method of claim 1 wherein the ammonia source is selected from the group consisting of ammonium bicarbonate, ammonium carbonate, ammonium carbamate, ammonium hydroxide, anhydrous ammonia and mixtures thereof.

8. The method of claim 1 wherein the aqueous slurry contains sufficient quantities of transition metal nitrate and the ammonia source to provide at least two moles of ammonia per mole of transition metal provided by the transition metal nitrate.

9. The method of claim 1 wherein the drying comprises spray drying.

10. The method of claim 1 wherein the heat treating comprises heating to a temperature of no more than about 135° C. for less than 10 minutes.

11. The method of claim 1 wherein the diammine dinitrate of the at least one transition metal is formed in a solid state reaction.

12. A method of making phase stabilized ammonium nitrate, the method comprising:

combining, in an aqueous slurry, at least a nitrate of one transition metal selected from the group consisting of copper, zinc, nickel and combinations thereof and an ammonia source, in at least a stoichiometric amount relative to the transition metal nitrate for formation of a corresponding transition metal diammine dinitrate, to form a first precursor;

forming a second precursor to the phase stabilized ammonium nitrate, the second precursor being in the form of a slurry containing the first precursor and ammonium nitrate, drying the second precursor to form a third precursor to the phase stabilized ammonium nitrate, the third precursor having the form of a powder, and heat treating the third precursor to form a phase stabilized ammonium nitrate comprising ammonium nitrate containing at least about 1 wt. % of a diammine dinitrate of the at least one transition metal.

13. The method of claim 12 wherein the phase stabilized ammonium nitrate contains at least about 10 wt. % of a diammine dinitrate of the at least one transition metal.

14. The method of claim 13 wherein the phase stabilized ammonium nitrate contains at least about 15 wt. % of a diammine dinitrate of the at least one transition metal.

15. The method of claim 12 wherein the nitrate of at least one transition metal is a nitrate of copper.

16. The method of claim 12 wherein the aqueous slurry contains sufficient quantities of transition metal nitrate and the ammonia source to provide at least two moles of ammonia per mole of transition metal provided by the transition metal nitrate.

17. The method of claim 12 wherein the drying comprises spray drying.

18. The method of claim 12 wherein the heat treating comprises heating to a temperature of no more than about 135° C. for less than 10 minutes.

19. The method of claim 12 wherein the diammine dinitrate of the at least one transition metal is formed in a solid state reaction.

* * * * *